United States Patent
Rioux et al.

(10) Patent No.: US 10,443,426 B2
(45) Date of Patent: Oct. 15, 2019

(54) BLADE OUTER AIR SEAL WITH INTEGRATED AIR SHIELD

(71) Applicant: UNITED TECHNOLOGIES CORPORATION, Farmington, CT (US)

(72) Inventors: Philip Robert Rioux, North Berwick, ME (US); Nicholas R. Leslie, South Berwick, ME (US); Richard K. Hayford, Cape Neddick, ME (US)

(73) Assignee: United Technologies Corporation, Farmington, CT (US)

( * ) Notice: Subject to any disclaimer, the term of this patent is extended or adjusted under 35 U.S.C. 154(b) by 494 days.

(21) Appl. No.: 14/972,893

(22) Filed: Dec. 17, 2015

(65) Prior Publication Data

US 2017/0175559 A1 Jun. 22, 2017

(51) Int. Cl.
*F01D 11/12* (2006.01)
*F01D 25/24* (2006.01)
*F04D 29/52* (2006.01)

(52) U.S. Cl.
CPC ............ *F01D 11/12* (2013.01); *F01D 11/122* (2013.01); *F01D 25/246* (2013.01); *F04D 29/526* (2013.01); *F05D 2220/32* (2013.01); *F05D 2230/237* (2013.01); *F05D 2230/312* (2013.01); *F05D 2240/11* (2013.01); *F05D 2240/30* (2013.01); *F05D 2250/15* (2013.01); *Y02T 50/671* (2013.01)

(58) Field of Classification Search
CPC ......... F01D 11/12; F01D 11/08; F01D 11/122
USPC ...................................................... 415/173.1
See application file for complete search history.

(56) References Cited

U.S. PATENT DOCUMENTS

| 4,329,113 | A | * | 5/1982 | Ayache | F01D 11/18 |
| | | | | | 415/116 |
| 4,411,594 | A | | 10/1983 | Pellow et al. | |
| 4,468,168 | A | * | 8/1984 | Aubert | F01D 11/08 |
| | | | | | 415/116 |
| 4,679,981 | A | | 7/1987 | Guibert et al. | |
| 5,080,557 | A | * | 1/1992 | Berger | F01D 11/08 |
| | | | | | 277/411 |
| 5,486,090 | A | * | 1/1996 | Thompson | F01D 11/08 |
| | | | | | 415/173.1 |

(Continued)

FOREIGN PATENT DOCUMENTS

| EP | 0522833 | 1/1993 |
| EP | 2687684 | 1/2014 |

(Continued)

OTHER PUBLICATIONS

Extended European Search Report for EP Application No. 16205180.9 dated Apr. 28, 2017.

*Primary Examiner* — Richard A Edgar
*Assistant Examiner* — Michael L Sehn
(74) *Attorney, Agent, or Firm* — Carlson, Gaskey & Olds, P.C.

(57) ABSTRACT

A blade outer air seal according to an example of the present disclosure includes a seal body extending circumferentially about an axis and including at least one channel having a substantially solid radially outer surface. A substrate is radially inward of the at least one channel with respect to the axis. The substrate and the at least one channel form at least one cavity. A rotor rub strip is radially inward of the substrate.

20 Claims, 6 Drawing Sheets

(56) References Cited

U.S. PATENT DOCUMENTS

| | | | |
|---|---|---|---|
| 7,597,533 B1 * | 10/2009 | Liang | F01D 9/02 415/116 |
| 7,665,962 B1 * | 2/2010 | Liang | F01D 11/24 415/115 |
| 8,100,640 B2 | 1/2012 | Strock et al. | |
| 8,123,466 B2 | 2/2012 | Pietraszkiewicz et al. | |
| 8,313,301 B2 * | 11/2012 | Hudson | B22C 9/103 416/191 |
| 2003/0220816 A1 | 10/2003 | Jasklowski et al. | |
| 2009/0169368 A1 | 7/2009 | Schlichting et al. | |
| 2014/0030071 A1 | 1/2014 | Leslie et al. | |

FOREIGN PATENT DOCUMENTS

| | | |
|---|---|---|
| GB | 1308771 | 3/1973 |
| GB | 1501916 | 2/1978 |
| GB | 2125111 | 2/1984 |
| WO | 2015102702 | 7/2015 |

* cited by examiner

BLADE OUTER AIR SEAL WITH INTEGRATED AIR SHIELD

BACKGROUND

This disclosure relates to a gas turbine engine, and more particularly to a blade outer air seal that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

A casing, associated with either the compressor section or the turbine section, may include blade outer air seals that provide an outer radial flow path boundary of the core flow path. The blade outer air seals may be positioned in relative close proximity to a blade tip of each rotating blade in order to seal between the blades and the casing.

The rotating blades and case generally have designed clearances. If the designed clearances are not maintained, a negative effect on gas turbine engine performance may result. The case typically includes an outer air seal located in the case opposite the rotor blade tip to aid in maintaining the clearances within a selected range. The outer air seals are mounted in the case, but often high heat transfer results from the gas path up into the flanges of the case. This results in faster case thermal expansion response than is often desirable, resulting in clearances outside of the selected range. Mass is often added to the case to slow the case response but has limited effectiveness and also increases the weight of the gas turbine engine.

SUMMARY

A blade outer air seal according to an example of the present disclosure includes a seal body extending circumferentially about an axis including at least one channel having a substantially solid radially outer surface, a substrate radially inward of the at least one channel with respect to the axis, where the substrate and the at least one channel form at least one cavity, and a rotor rub strip radially inward of the substrate.

A further embodiment of any of the foregoing embodiments includes a substrate support forming an axial edge of the channel, wherein the substrate abuts the substrate support.

In a further embodiment of any of the foregoing embodiments, the substrate extends axially across a majority of the seal body.

In a further embodiment of any of the foregoing embodiments, the seal body includes a plurality of channels, and the substrate and the plurality of channels form a plurality of cavities.

A further embodiment of any of the forgoing embodiments includes a passage extending axially from one of the plurality of channels to another of the plurality of channels and a vent extending from the one of the plurality of channels to an outer peripheral surface of the seal body.

In a further embodiment of any of the foregoing embodiments, the plurality of channels are separated axially by at least one substrate support, wherein the substrate abuts the substrate support.

In a further embodiment of any of the foregoing embodiments, the substrate is brazed to the substrate support.

In a further embodiment of any of the foregoing embodiments, the rotor rub strip is plasma sprayed onto the substrate.

In a further embodiment of any of the foregoing embodiments, the plurality of channels are axially spaced from one another and extend 360 degrees circumferentially about the seal body.

In a further embodiment of any of the foregoing embodiments, the plurality of channels are formed by a continuous spiral groove extending axially and circumferentially about the seal body.

A further embodiment of any of the forgoing embodiments includes a plurality of channels in the seal body each having a substantially solid radially outer surface and one channel in the seal body having a vent extending from the one channel to an outer peripheral surface of the seal body, wherein the one channel is in fluid communication with the plurality of channels through at least one axially extending passage.

An engine component according to an example of the present disclosure includes a rotor rotatable about an axis and including at least one rotor blade and a blade outer air seal arranged radially outward of the rotor with respect to the axis. The blade outer air seal includes a seal body extending circumferentially about the axis and including at least one channel having a substantially solid radially outer surface and a substrate radially inward of the at least one channel. The substrate and the at least one channel form at least one cavity, and a rotor rub strip is radially between the substrate and the at least one rotor blade.

In a further embodiment of any of the foregoing embodiments, the seal body includes a plurality of channels and the substrate and the plurality of channels form a plurality of cavities.

In a further embodiment of any of the foregoing embodiments, the plurality of channels are separated axially by at least one substrate support, and the substrate abuts the substrate support.

A further embodiment of any of the forgoing embodiments includes a passage extending axially from one of the plurality of channels to another of the plurality of channels and a vent extending from the one of the plurality of channels.

A gas turbine engine according to an example of the present disclosure includes a rotating component rotatable about an axis and including at least one rotor blade. A blade outer air seal is arranged radially outward of the rotating component with respect to the axis. The blade outer air seal includes a seal body extending circumferentially about the axis and including at least one channel having a substantially solid radially outer surface and a substrate radially inward of the at least one channel. The substrate and the at least one channel form at least one cavity, and a rotor rub strip is radially between the substrate and the at least one rotor blade.

In a further embodiment of any of the forgoing embodiments, the rotating component is a compressor rotor.

In a further embodiment of any of the forgoing embodiments, the seal body includes a plurality of channels, and the substrate and the plurality of channels form a plurality of cavities.

In a further embodiment of any of the forgoing embodiments, the plurality of channels are separated axially by at least one substrate support, and the substrate abuts the substrate support.

In a further embodiment of any of the foregoing embodiments, a passage extends axially from one of the plurality of channels to another of the plurality of channels, and a vent extends from the one of plurality of channels.

DETAILED DESCRIPTION

Figure 1:
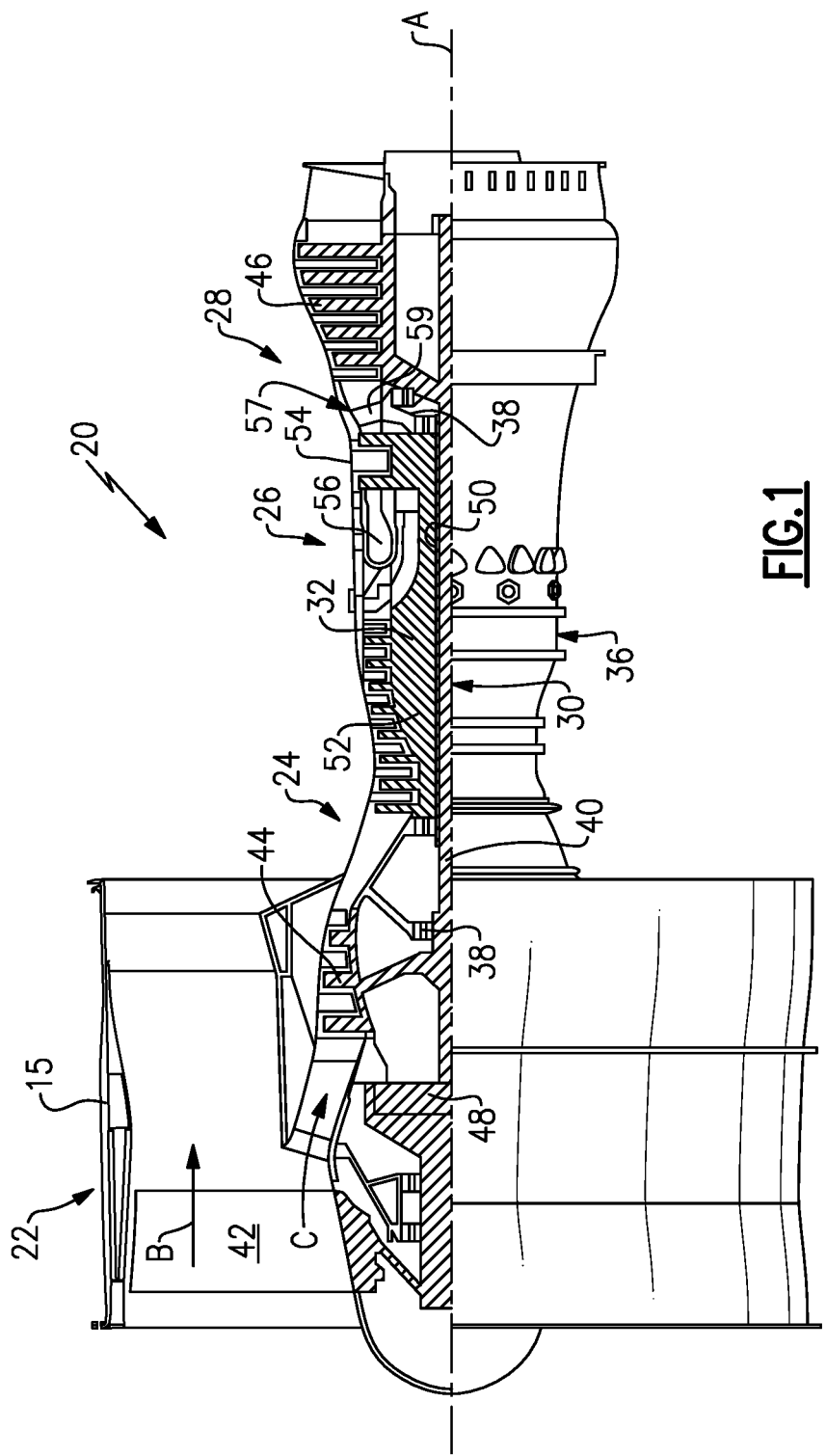
FIG. 1 illustrates a schematic, cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five (5). In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° R)]^{0.5}$. The "Low corrected fan tip speed" as disclosed herein according to one non-limiting embodiment is less than about 1150 ft/second (350.5 meters/second).

Figure 2:
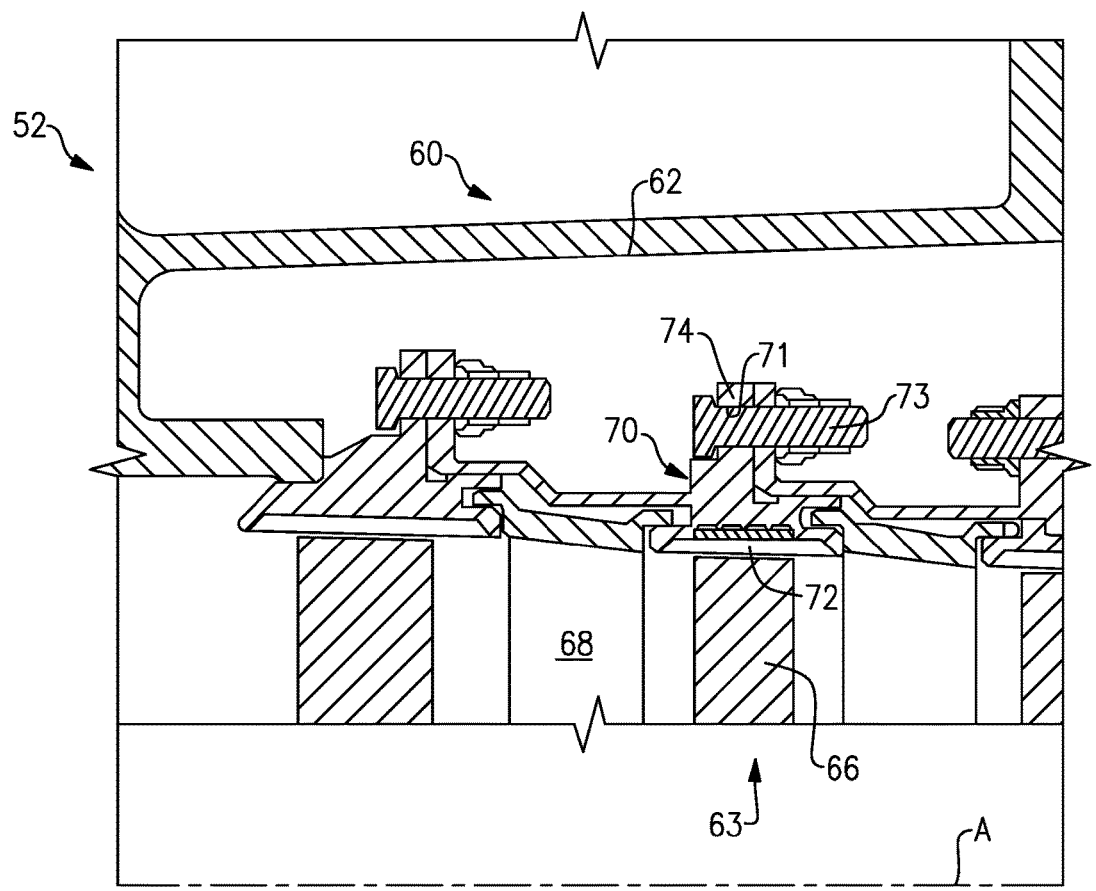
FIG. 2 illustrates a schematic, cross sectional view of an embodiment of a compressor of a gas turbine engine.

FIG. 2 illustrates a cross-sectional view of an embodiment of a high pressure compressor 52 arranged around engine centerline axis A. The high pressure compressor 52 includes a compressor case 60 including an outer case 62. The high pressure compressor 52 includes a rotor section 63 having a rotor disk (not shown) and rotor blades 66 extending radially from the rotor disk and rotatable about the engine centerline axis A. The rotor section 63 may be axially spaced from a stator vanes 68 or positioned axially between two stator vanes.

A blade outer air seal 70 is arranged radially between the rotor blades 66 and the outer case 62. The blade outer air seal 70 includes a rotor rub strip 72 at its radially inner end. The example rotor rub strip 72 extends along substantially the entire axial length of the blade outer air seal 70. The rotor rub strip 72 may be abradable such that it is configured to abrade when in contact with the rotor blades 66. Alternatively, the rotor rub strip 72 may be abrasive such that of the rotor blades 66 will abrade when contacting the rub strip 72.

At its radially outer end, the blade outer air seal 70 may include a flange 74 for attachment of the outer air seal 70 to another static component, such as an adjacent blade outer air seal. The flange 74 may include an opening 71 for receiving a bolt 73 for attachment to the outer case 62 or adjacent static components.

Figure 3:
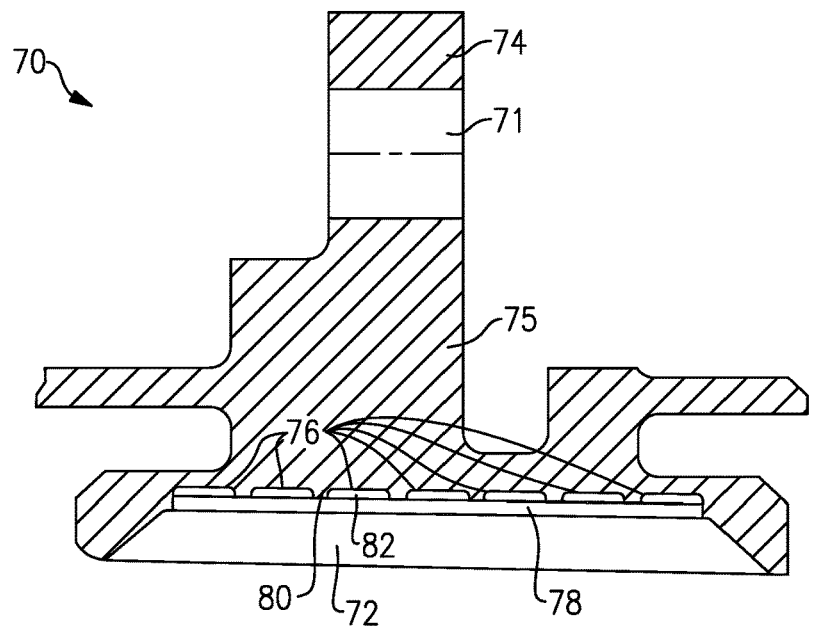
FIG. 3 illustrates a cross-sectional view of an embodiment of a blade outer air seal.
Figure 5:
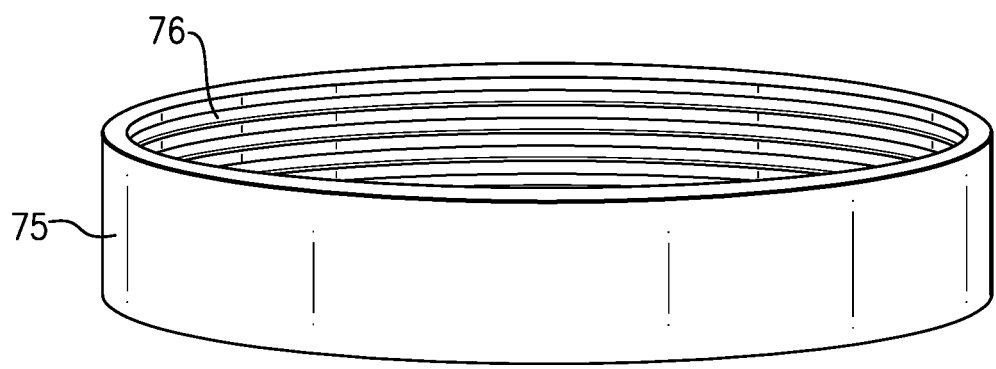
FIG. 5 illustrates schematically an example arrangement of passages in an embodiment of a blade outer air seal.
Figure 6:
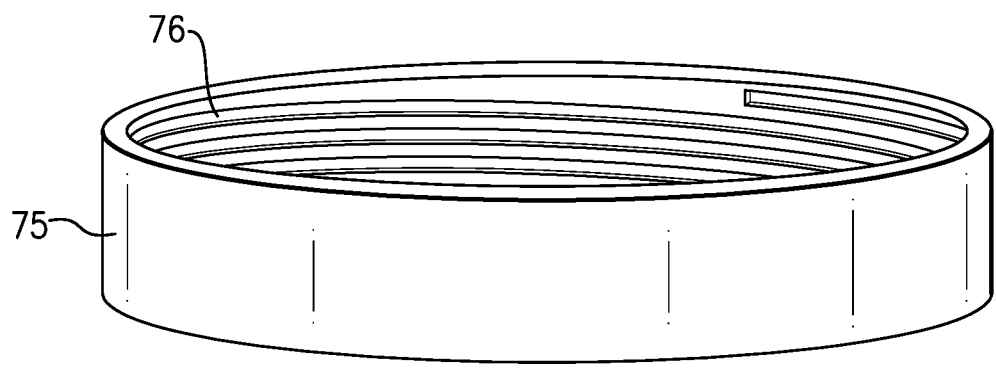
FIG. 6 illustrates schematically an alternative example arrangement of passages in an embodiment of a blade outer air seal.

FIG. 3 illustrates an example embodiment of a blade outer air seal 70 having a seal body 75 including channels 76 extending circumferentially for 360° about the seal body 75, and spaced axially from each other (see FIG. 5). In one alternative embodiment, the channels 76 may be provided by a single spiraling groove extending circumferentially and axially across a portion of the seal body 75 (see FIG. 6). Referring back to FIG. 3, although seven axially spaced channels are shown in the embodiment, one of ordinary skill in the art having the benefit of this disclosure would recognize that more or fewer channels 76, including a single channel, could be utilized. As shown, there are channels 76 axially across a majority of the axial length of the outer air seal 70. Alternatively, the channels 76 may be localized at a forward axial section of the blade outer air seal 70, a center axial section of the blade outer air seal 70, or at an aft axial section of the blade outer air seal 70. The example channels 76 are each substantially the same radial distance from the axis A.

A substrate 78 is applied radially inward of the channels 76. The example substrate 78 extends axially across a major axial portion of the blade outer air seal 70. In the illustrated embodiment, the substrate 78 extends axially the same distance as the channels 76. The rotor rub strip 72 is then applied to a radially inner surface of the substrate 78. In one embodiment, the rotor rub strip 72 is brazed onto the substrate 78. In another embodiment, the rotor rub strip 72 is plasma-sprayed onto the substrate 78. The rotor rub strip 72 may be a compressed sintered metal. For plasma sprayed applications, the rotor rub strip may be a ceramic or plastic mixed with metal. One of ordinary skill in the art having the benefit of this disclosure would realize that other materials may be utilized. As mentioned, the rotor rub strip 72 may be abrasive or abradable. The example rotor rub strip 72 and substrate 78 are free of any passages.

In the embodiment, the channels 76 are separated axially by one or more substrate supports 80. The substrate 78 abuts the radially inner surfaces of the substrate supports 80 such that the channels 76, the substrate 78 and the substrate support 80 form cavities 82. In one embodiment, the substrate 78 may be a piece of metal welded or brazed onto the substrate supports 80. The substrate 78 effectively separates the cavities 82 from the rub strip 72. The cavities 82 are filled with air and effectively operate as integrated air shields to break the thermal conduction paths in the blade outer air seal 70. This slows the thermal conduction path toward the flange 74 and therefore slows the case response.

Although the example blade outer air seal 70 is shown in the high-pressure compressor 52, the outer air seal 70 may be utilized for sealing between any rotating and stationary components in a gas turbine engine, including other compressors and turbines.

Figure 4:
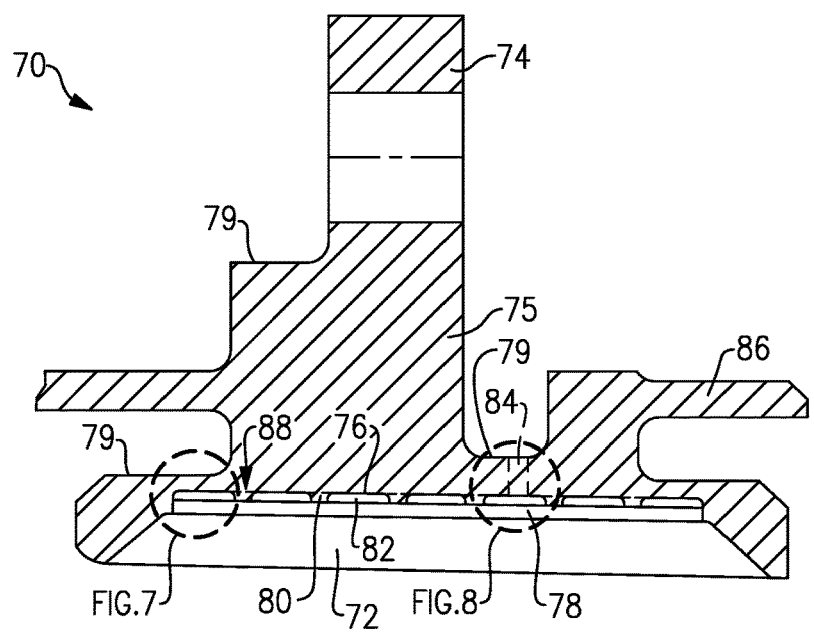
FIG. 4 illustrates a cross-sectional view of an embodiment of a blade outer air seal.

As illustrated in FIG. 4, the example outer air seal 70 may include a vent 84 in communication with one or more of the cavities 82. The example vent 84 extends from a cavity 82 to a radially outer edge of the blade outer air seal 70 axially between stator attachment feature 86 and an axially central portion of the outer air seal body 75.

The example blade outer air seal 70 may further include one or more passages 88 (shown schematically in FIGS. 7 and 8) extending axially across the channels 76 to create a fluid communication between the cavities 82 and the vent 84 for thermal dissipation from all cavities 82 out of the vent 84. The passages 88 and vent 84 operate to prevent the cavities 82 from pressurizing when heated. In one embodiment, the passage 88 is about 0.05 to 0.1 inches wide in the circumferential direction. There may be one passage 88 or multiple circumferentially spaced passages 88. The cavities 82 are dead cavities in that air is not supplied to them; air may only be vented out through the vent 84.

Figure 7:
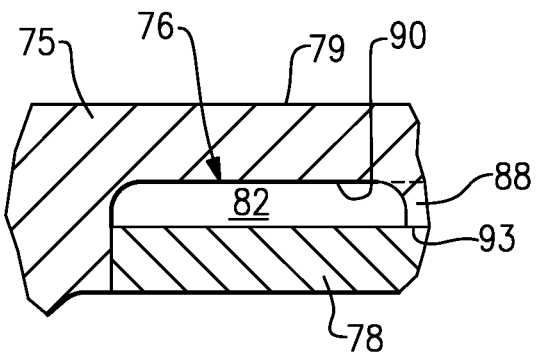
FIG. 7 illustrates an enlarged view of a portion of the embodiment in FIG. 4.

FIG. 7 illustrates an exploded view of one of the cavities 82 shown in FIG. 4. Because the cavity 82 is a dead cavity, the channel 76 is essentially a "blind hole" in that the radially outer surface 90 of the channel 76 does not extend through the outer peripheral surface 79 of the seal body 75. The surface 90 is thus a solid surface formed by the seal body 75, and the channel 76 extends radially from a radially inner surface 93 of the seal body to the solid surface 90. The channel 75 and the substrate 78 form a cavity 82 that is enclosed at its radially outer end by the solid surface 90 of the seal body 75, and the cavity 78 insulates the flange 74 from the gas path. The cavity 82 may include a passage 88 extending axially from an axial end of the cavity 82 to an adjacent cavity. The passage 88 allows for the only fluid communication out of the cavity 82.

Figure 8:
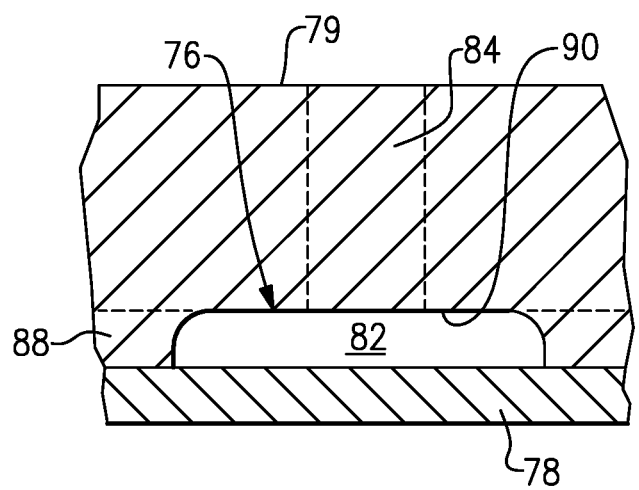
FIG. 8 illustrates an enlarged view of a second portion of the embodiment in FIG. 4.

FIG. 8 illustrates an exploded view of the cavity 82 shown in FIG. 4 that is in communication with the vent 84. While one of the cavities is in direct communication with the vent 84, which is the cavity illustrated in FIG. 8, the rest of the cavities 82 are dead channels as shown in FIG. 7. Alternatively, as shown in the embodiment of FIG. 3, all channels 76 may be dead channels. Referring back to FIG. 8, the vent 84 extends from a radially outer surface 90 of the channel 76 to a radially outer peripheral surface 79 of the seal body 75. The example vent 84 allows heated and/or pressurized air to exit the cavities 82 and is not used for providing air into the cavities 82. The cavity 82 having the vent 84 is in communication with the radially outwardly enclosed cavities through the axially extending passage 88.

The example outer air seal 70 reduces or eliminates the need to add mass to slow the thermal response. The air cavities 82 effectively interrupt the thermal conduction path through the seal body 75 and toward the flange 74, by acting as insulation between the gas path and the flange 74. The example blade outer air seal 70 also reduces thermal gradients in the flange 74, effectively extending the low cycle fatigue life of the part. The example blade outer air seal has been shown to achieve lower temperatures at various points in the seal body 75 during operation, when compared with prior art seals under the same conditions. The number and width of the substrate supports 80 may be varied. Decreasing the width of the substrate supports 80 would minimize the thermal response. Thus, the example cavities 82 may extend farther in an axial direction than in a radial direction. As illustrated, the radial cross section of the channels 76 form a half-moon shape, but other shapes are contemplated.

Figure 9:
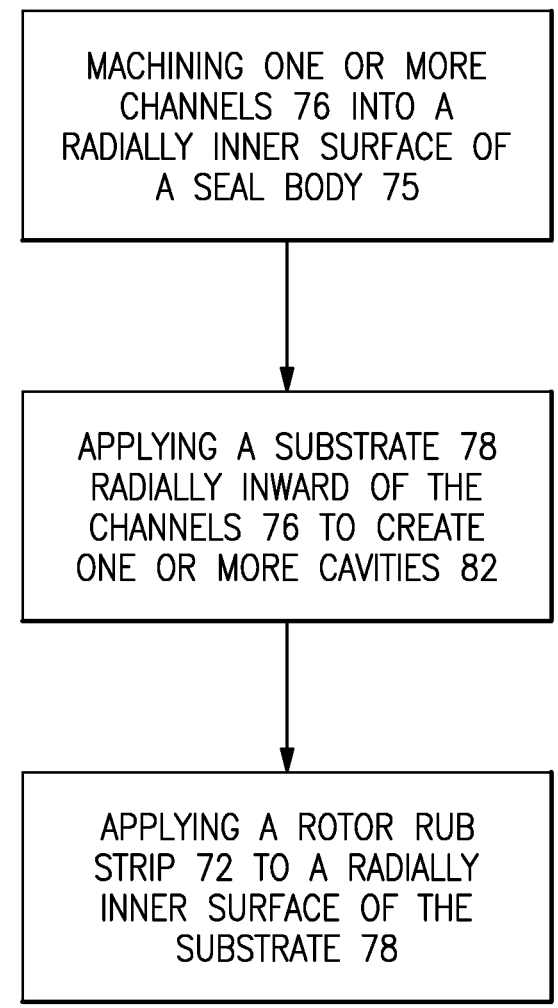
FIG. 9 schematically illustrates a method for making an embodiment of a blade outer air seal.

As illustrated in FIG. 9, with continued reference to FIGS. 1-8, a method for making a blade outer air seal 70 according to one or more of the disclosed embodiments is also disclosed. One or more channels 76 are machined into a radially inner surface of a seal body 75 of a blade outer air seal. One or more of the channels 76 are blind holes in that they do not extend to an outer peripheral surface 79 of the seal body 75. As one alternative, the seal body 75 may be made by additive manufacturing. A substrate 78 is then applied radially inward of the channels 76 to form one or more cavities 82. The substrate 78 may be brazed or welded onto substrate supports 80 separating the one or more channels 76. A rotor rub strip 72 is then applied to a radially inner surface of the substrate 78. The rotor rub strip 72 may be brazed or plasma sprayed onto the substrate 78. The method may be utilized to make new seals or retrofit into existing seals.

It should be understood that relative positional terms such as "forward," "aft," "upper," "lower," "above," "below," and the like are with reference to the normal operational attitude of the vehicle and should not be considered otherwise limiting. Terms such as "generally," "substantially," and "about" are not intended to be boundaryless terms, and should be interpreted consistently with the way one skilled in the art would interpret those terms The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

We claim:

1. A blade outer air seal, comprising:
a seal body extending circumferentially about an axis and including a plurality of channels, a stator attachment feature, a flange extending radially outward of and spaced axially forward of the stator attachment feature with respect to the axis, the flange being substantially axially centrally located relative to the seal body, and a vent extending from one of the plurality of channels to a radially outer edge of the seal body axially between the stator attachment feature and the flange;
a substrate radially inward of the plurality of channels, wherein the substrate and the plurality of channels form a plurality of cavities, and at least one of the plurality of cavities is enclosed at its radially outer end by a solid surface of the seal body; and
a rotor rub strip radially inward of the substrate.

2. The blade outer air seal as recited in claim 1, wherein the flange includes an opening for receiving a bolt.

3. The blade outer air seal as recited in claim 1, wherein the at least one of the plurality of cavities is axially aligned with and radially inward of the flange.

4. The blade outer air seal as recited in claim 3, wherein the one of the plurality of channels and the at least one of the plurality of cavities are in fluid communication through an axially extending passage.

5. The blade outer air seal as recited in claim 1, wherein the radially outer edge of the seal body at the vent is radially inward of at least a portion of the flange and at least a portion of the stator attachment feature.

6. The blade outer air seal as recited in claim 1, wherein the rotor rub strip is plasma sprayed onto the substrate.

7. A gas turbine engine comprising:
a rotating component rotatable about an axis and including at least one rotor blade;
a stator section axially aft of the rotating component;
a blade outer air seal arranged radially outward of the rotating component with respect to the axis, the blade outer air seal comprising
a seal body extending circumferentially about the axis and including a plurality of channels and providing a flange and a stator attachment feature axially spaced from the flange and attached to the stator section, wherein the seal body includes a vent extending from a second one of the plurality of cavities to a radially outer edge of the seal body axially between the stator attachment feature and the flange;
a substrate radially inward of the plurality of channels, wherein the substrate and the plurality of channels form a plurality of cavities, at least one of the plurality of cavities is enclosed at its radially outer end by a solid surface of the seal body, and the at least one of the plurality of cavities is radially inward of and axially aligned with the flange; and
a rotor rub strip radially between the substrate and the at least one rotor blade.

8. The gas turbine engine as recited in claim 7, comprising an outer casing, wherein the flange is bolted to the outer casing.

9. The gas turbine engine as recited in claim 7, wherein the at least one of the plurality of cavities and the second one of the plurality of cavities are in fluid communication through a passage.

10. The gas turbine engine as recited in claim 7, wherein a third of the plurality of cavities is axially aft of the second one of the plurality of cavities.

11. The gas turbine engine as recited in claim 7, wherein the flange is substantially axially centrally located relative to the seal body.

12. The blade outer air seal as recited in claim 7, wherein the substrate and the rotor rub strip are free of any passages.

13. The blade outer air seal as recited in claim 7, wherein the stator attachment feature is axially aft of the flange.

14. A blade outer air seal, comprising:
a seal body extending circumferentially about an axis and including a plurality of channels, a stator attachment feature, a flange extending radially outward of and spaced axially forward of the stator attachment feature with respect to the axis, wherein the plurality of channels are separated by a plurality of substrate supports;
a substrate radially inward of the plurality of channels, wherein the substrate and the plurality of channels form a plurality of cavities, and at least one of the plurality of cavities is enclosed at its respective radially outer end by a solid surface of the seal body, at its respective axial ends by first and second of the substrate supports, and at its radially inner end by the substrate; and a rotor rub strip radially inward of the substrate.

15. The blade outer air seal as recited in claim 14, wherein the rotor rub strip is plasma sprayed onto the substrate.

16. The blade outer air seal as recited in claim 14, wherein the flange is substantially axially centrally located relative to the seal body.

17. The blade outer air seal as recited in claim 16, wherein the flange includes an opening configured to receive a bolt, and the stator attachment feature includes a radially outward extending portion and an axially extending portion extending from the radially outward extending portion.

18. The blade outer air seal as recited in claim 16, wherein the at least one of the plurality of cavities is axially aligned with and radially inward of the flange.

19. The blade outer air seal as recited in claim 14, wherein the substrate comprises a piece of metal welded or brazed onto the substrate supports.

20. The blade outer air seal as recited in claim 14, wherein the rotor rub strip is abrasive.

* * * * *